April 6, 1965 G. W. KEENE 3,176,658
ANIMAL RUBBING AND LIQUID APPLYING APPARATUS
Filed Aug. 20, 1962 2 Sheets-Sheet 1
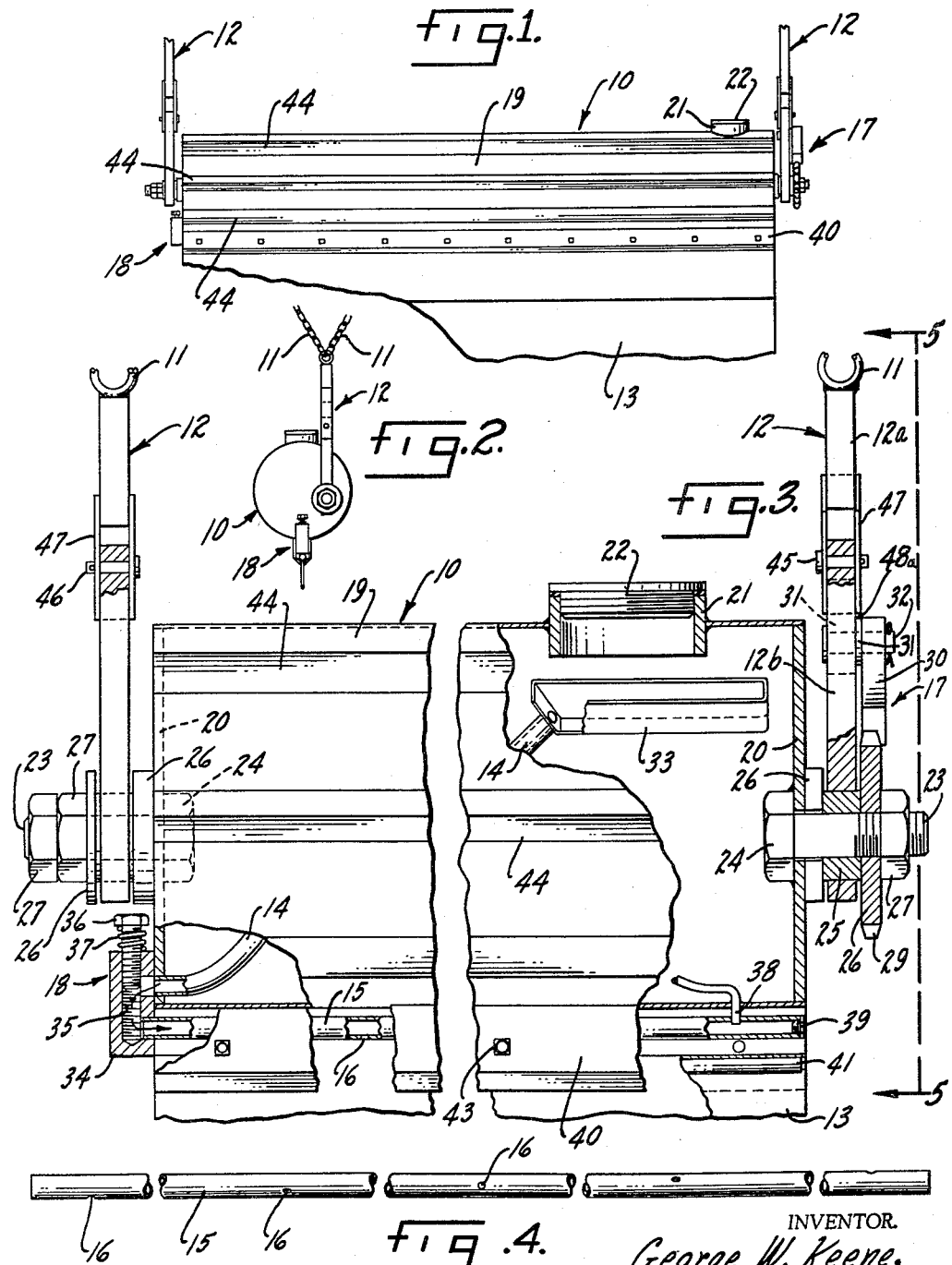
INVENTOR.
George W. Keene,
BY Donald L. Welsh
Attorney.

April 6, 1965 G. W. KEENE 3,176,658
ANIMAL RUBBING AND LIQUID APPLYING APPARATUS
Filed Aug. 20, 1962 2 Sheets-Sheet 2
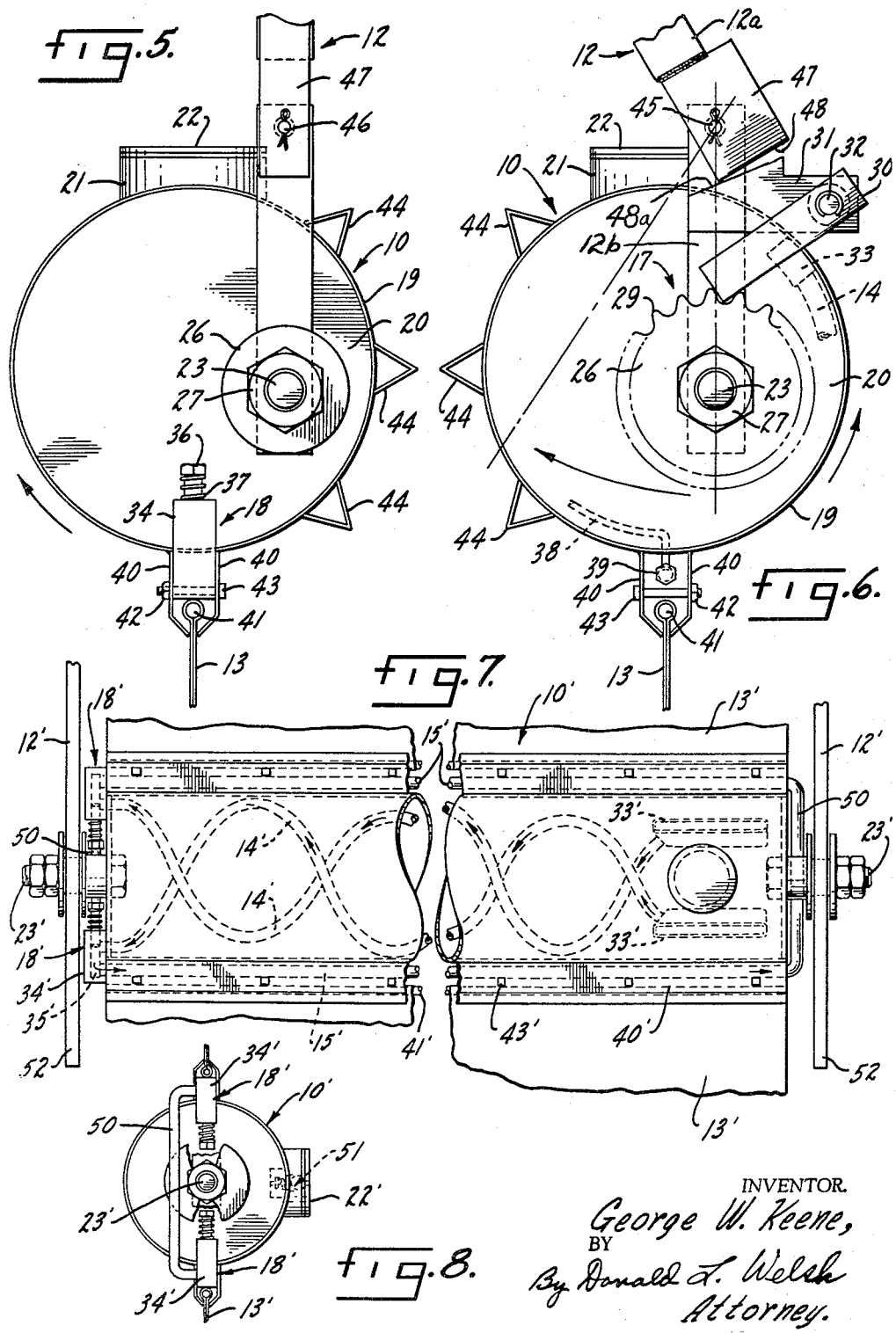
INVENTOR.
George W. Keene,
BY Donald L. Welch
Attorney.

United States Patent Office 3,176,658
Patented Apr. 6, 1965

3,176,658
ANIMAL RUBBING AND LIQUID APPLYING
APPARATUS
George W. Keene, 619 N. 12th St., Rochelle, Ill.
Filed Aug. 20, 1962, Ser. No. 217,852
11 Claims. (Cl. 119—157)

This invention relates generally to apparatus for use by livestock such as cattle or pigs for rubbing or scratching their hides and also applying liquids, for example, insecticides and hide conditioning agents, to the hides during the rubbing. More particularly, the invention relates to a liquid applying and rubbing apparatus of the type which is suspended above the ground from an overhead support and in which, during engagement and rubbing by the animal, liquid is transferred from a reservoir to the exterior surfaces of the apparatus engaged by the animal.

The general object of the invention is to provide novel apparatus of the above character which is simpler and less expensive to construct than previous apparatus of the same type, which results in a more even and controlled flow of liquid, which is more rugged and capable of withstanding the hard usage resulting from repeated contact by the animals, and which is more free from malfunction due to weather conditions or dirt on the animals.

Another object is to provide novel apparatus which delivers liquid only while being moved by an animal and then only in controlled amounts so as to avoid liquid loss or excess liquid delivery regardless of the height of the apparatus or its attitude with respect to the ground.

A more detailed object is to deliver liquid to the exterior of the liquid container through an Archimedes' screw pump which is not sensitive to tilting or height adjustments and which delivers uniform amounts of liquid as the liquid supply diminishes.

Another object is to locate the rotary axis of the liquid container in a novel manner with respect to the longitudinal axis of symmetry of the container so that one end of the container is raised and lowered with respect to the other to insure gravitation of liquid along the full length of an external outlet pipe as the container rotates and to insure transfer of all liquid to the outlet pipe.

Still another object is to increase the area of distribution of liquid by providing a plurality of outlet pipes and pumps for delivering fluid during rotation of the liquid container.

The invention also resides in the novel arrangement of an air inlet pipe for the relief of vacuum within the liquid container while, at the same time, providing for return of excess liquid from the outlet pipe to the interior.

A further object is to construct the suspension members for the liquid container and a one-way connection therewith in a novel manner to effect rotation of the container simply by raising and lowering of its end nearest the suspension member.

Other objects and advantages will become apparent from the following detailed description taken in connection with the accompanying drawings in which:

FIGURE 1 is a fragmentary side elevational view of rubbing and liquid applying apparatus embodying the novel features of the present invention.

FIG. 2 is an end elevational view of the apparatus looking from the left in FIG. 1.

FIG. 3 is an enlarged view similar to FIG. 1 with some of the parts broken away and shown in section.

FIG. 4 is a bottom elevational view of the outlet pipe.

FIG. 5 is an enlarged end view looking from the left in FIG. 3.

FIG. 6 is an enlarged end view looking from the right in FIG. 3 along the line 5—5.

FIG. 7 is a reduced view similar to FIG. 3 and showing a modified pump and outlet tube arrangement, and, FIG. 8 is a reduced view of one end of the modification looking from the left of FIG. 7.

The apparatus shown in the drawings for purposes of illustrating the present invention is especially suited for conditioning the hides of animals such as cattle or pigs and is of the type having an exterior surface against which the animals may rub their hides and to which a liquid is applied for transfer to the animal hides during the rubbing. As is well known, the liquid usually includes hide conditioning agents such as oil and also insecticides for killing any vermin or other pests on the animal. The apparatus also is of the type in which the liquid is delivered to the animal rubbing surface as an incident to and during engagement by the animal.

The present invention contemplates a novel construction of apparatus of the above character which is simple and inexpensive, which delivers liquid reliably and in controlled amounts to animals, and which is free from damage liable to result from contact by the animals. To these ends, the apparatus comprises generally an elongated liquid container 10 which, instead of being supported on framework on the ground, is suspended by elongated, flexible elements 11 located at opposite ends of the container. While the elements may take various forms, they preferably are chains which are connected to opposite ends of the container by supports 12. To avoid a pendulum swinging of the container, there are two chains at each of its ends and these diverge upwardly away from the associated support so as to form a V. At their upper ends, the chains are connected at spaced points to a suitable horizontal framework such as the top of a doorway (not shown). It will be apparent that, when left free, each end of the container will return to a normal stable position with the chains taut, the chains and the overhead framework being arranged to dispose the container in a generally horizontal position under these conditions.

Liquid stored within the container 10 is transferred to the exterior of the container and to a sheet 13 of absorbent material where it is retained until contacted by an animal. The sheet which may be canvas, for example, preferably extends the full length of the container and hangs in a vertical plane in the normal position of rest of the container shown in the drawings. The transfer of liquid is effected by a pump 14 which operates in response and as an incident to movement of the apparatus by an animal. The movement which operates the pump is a rotary movement and, to provide this, the container is rotatably mounted on the supports 12. To distribute the liquid along the length of the canvas and the container, the liquid delivered by the pump flows into an outlet pipe 15 which extends along the canvas and is formed with spaced outlet holes 16 for the gravitation of liquid to the canvas.

In a preferred form of apparatus shown in FIGS. 1 to 6, the pump 14 which operates in response to rotation of the container 10 by an animal is an Archimedes' screw supported by the container and spiralling about the container axis from an inlet end adjacent one end of the container to an outlet end at the other end of the container. Rotation of the container is permitted in only one direction correlated with the direction of spiralling of the pump so that liquid will flow into the inlet end of the pump and along its length to the outlet end. Such limited rotation is achieved by providing a one-way coupling 17 between the container and at least one of its supports. While the inlet end of the Archimedes' screw may be located inside the tank with the remainder of the screw formed with the outlet holes and spiralling about the exterior of the tank to constitute the outlet pipe 15, it is perferred to spiral the screw around the interior of the tank and provide a separate exterior outlet pipe. At its outlet end, the interiorly located Archimedes' screw communicates with the inlet end of the outlet pipe through a valve 18 which is adjustable manually to control the liquid flow.

The liquid container 10, in the present instance, is a cylindrical tank 19 having end plates 20 telescoping and secured within its ends as by welding. Liquid is delivered to the interior of the tank through a filler tube 21 (FIG. 3) secured by welding within an aperture in the cylindrical wall 19 of the tank and threaded internally to receive a removable plug 22. The rotary mounting for the tank is of simple and inexpensive construction and comprises bolts whose shanks 23 extend through apertures in the end plates and whose heads 24 are welded against the inner sides of the plates with the shanks forming shafts extending outwardly beyond the plates and into bearing sleeves 24 preferably of a porous material impregnated with a lubricant. These sleeves are journaled in apertures in the supports 12 and, at their ends, engage washers 26 encircling the shanks and extending radially beyond the sleeves to provide bearing surfaces which straddle the supports and engages the same to absorb end sway stresses. Nuts 27 are threaded onto the shanks to hold the parts assembled, the position of the nuts being adjusted to permit some end play of the bearing sleeves.

To avoid twisting of the chains 11 or tangling with the shafts 23 or ends of the tank 10 as the ends are raised and slack develops in the chains, the supports 12 preferably take the form of elongated arms which normally are disposed vertically and extend from the shafts beyond the periphery of the tank. At its upper end, each arm is connected to its two chains through a common link welded to the arm, the latter herein being bar stock. At its lower end, each bar is apertured to receive the bearing sleeve 25. In addition to reducing the chance of tangling, the arms are less expensive per unit length than chains and therefore reduce the cost of the apparatus.

The one-way coupling 17 between the tank 10 and the supporting arms 12 preferably comprises a pawl and ratchet mechanism. While such a mechanism may be provided at each end of the tank so as to increase the effective rotary action, the apparatus preferably is simplified as shown in the drawings by providing the pawl and ratchet at only one end. The ratchet, in this instance, is in the form of a disc forming the outer one of the washers 26 threaded onto the shank to cooperate with the nut 27 to form a lock nut. Teeth 29 on the periphery of the ratchet disc are engaged by a pawl 30 in the form of a bar which is pivoted on a plate 31 projecting rigidly and laterally from the associated supporting arm. The pivot 32 for the pawl comprises simply a cotter pin extending through apertures in the plate and the bar, the free end of the pawl being urged by gravity into engagement with the ratchet teeth.

In the present instance, the Archimedes' pump 14 is a tube of circular cross section which spirals in a clockwise direction as viewed in FIG. 6 from the right end portion of the cylindrical tank 19 to the left end plate 20 as viewed in FIGS. 1 and 3. This direction of spiralling is correlated with the direction of rotation of the tank permitted by the pawl 30 and ratchet 26, that is, counterclockwise as viewed in FIG. 6, so that the pump delivers fluid during the rotation. Herein, the tube lies against the inner periphery of the tank and is secured thereto as by spot welding along spaced points of the tube. To pick up a large amount of liquid in the right end of the tank even though liquid level becomes low, the inlet end of the pump terminates in a pick-up trough 33 of rectangular shape having an opening on one side facing circumferentially in the direction of turning of the tank. The outlet end of the pump tube is secured within an aperture in the left end plate of the tank as viewed in FIG. 3 and registers with a port in a hollow body 34 of the valve 18, the body being secured as by welding to the outer side of the left end plate. The port opens into an elongated tapped central bore 35 of the valve body communicating at its lower end with the outlet pipe 15 which is secured within a cross bore in the valve body. The flow of liquid from the pump to the outlet pipe is adjusted by changing the axial position of a bolt 36 threaded into the central bore of the valve body to form the valve stem, a spring 37 acting between the head on the bolt and the valve body to retain the bolt in adjusted position.

The outlet pipe 15 is a cylindrical tube extending substantially the full length of the tank 10 and secured at one end within the valve body 34 as noted above. The other end of the pipe is secured to the tank by a tube 38 whose purpose will be described below. Uniform delivery of liquid from the interior of the outlet pipe to the canvas sheet 13 in the different angular positions of the tank about the rotary axis defined by the bearings 25 for the shafts 23 is insured by a novel arrangement of the outlet pipe holes 16 to compensate for such variation in the tank angular position. While the outlet pipe may be spiralled about the tank and thereby locate the holes on a spiral, it is preferred to use a straight pipe and arrange the holes along a spiral about the exterior of the outlet pipe. In this instance, there are five holes at uniformly spaced points along the length of the outlet pipe. These are located on a spiral which extends around only 180° of the outlet pipe so that the holes open downwardly only when the pipe is in the lower half of each revolution of the tank. The arrangement of the holes in this manner is shown in FIG. 4.

To insure distribution of liquid throughout the length of the outlet pipe 15 and therefore throughout the length of the canvas drape 13, the bolts 23, 24 supporting the tank 10 for rotation are located in a novel manner to effect an alternate raising and lowering of each end of the tank as it is rotated through a complete revolution. In this arrangement, both bolt shanks 23 are spaced below a horizontal plane through the axis of the cylinder 19 and, in addition, the bolts are offset horizontally in opposite directions from the tank axis. This arrangement is illustrated in FIGS. 5 and 6 which show the offset of the respective bolts horizontally from a vertical plane through the tank axis when the bolts are located the same distance beneath a horizontal plane through the axis. Referring to these figures, it will be seen that the offset of the bolt with the ratchet 26 is slightly less than that of the bolt at the other end where there is no ratchet.

With the drape 13 in a vertical position beneath the tank 10 and with the bolts 23 located beneath the horizontal plane through the tank axis and on opposite sides of a vertical plane through the axis, the tank is in a state of equilibrium. As the tank is rotated from this position and in a clockwise direction as shown by the arrow in FIG. 5, that end of the tank which is remote from the ratchet 26 rises with respect to its supporting bolt 23 and, at the same time, the ratchet end of the tank moves counter-clockwise and downwardly with respect to its bolt as viewed in FIG. 6. With continued rotation and as the axes of the bolts pass a vertical plane through the tank axis, the ratchet end of the tank will begin to rise and the other end will begin to descend. At a subsequent point during continued rotation when both bolts are above the horizontal plane or are higher than the axis, the tank is unstable or in a top heavy condition and will tend to rotate back to the starting position without the continued application of external forces.

Novel means is provided to relieve any vacuum within the tank 10 and thereby assist the free flow of liquid through and outwardly from the Archimedes' tube 14. This means comprises the tube 38 which supports the end of the outlet pipe 15 remote from the valve body 34, this tube opening into the outlet pipe and extending therefrom along a spiral around the interior of the tank from the end adjacent the ratchet 26 end to the other end. The direction of spiralling of the air tube is the same as the direction of the Archimedes' pump so that no liquid flows into the outlet end of the air tube. Preferably, the air inlet tube lies against the Archimedes' tube. Through its communication with the outlet pipe at the end remote from the valve body, the air tube serves the additional function of returning to the interior of the tank any excess liquid tending to fill the outlet pipe, the extreme end of the pipe being closed by a removable plug 39 (FIG. 3). With this arrangement, air may flow freely into the tank through the air tube and returning oil will tend to keep the air tube clean.

The support for the drape 13 is of simple construction enabling the drape to be replaced easily when it becomes worn out. This support thus comprises two plates 40 of generally rectangular shape which extend longitudinally of the tank in parallel with the tank axis and are welded at one edge to the exterior of the tank along circumferentially spaced parallel lines. From the welded edges, the plates extend first in parallelism with each other and a radial plane between them and then are bent inwardly toward each other as shown in FIGS. 5 and 6. The bent end portions of the plates engage opposite sides of the canvas sheet after the sheet has been wrapped around a dowel 41 disposed between the plates. The plates are flexible enough that the bent end portions may be moved toward each other into clamping engagement with opposite sides of the sheet after the dowel with the sheet has been advanced endwise between the plates. To draw the plates against opposite sides of the canvas, nuts 42 are tightened on bolts 43 extending through aligned apertures in the plates at points spaced along their lengths.

The exterior of the tank 10 is roughened or provided with projections 44 to enable an animal rubbing the tank to turn the same easily to the position in which the tank is turned by its own weight back to the stable position. In the present instance, there are three of these projections which take the form of elongated ribs extending along the exterior of the tank in parallel with the tank axis, each rib extending throughout the length of the tank. Each rib is of V-shaped cross section with its parallel edges lying against and welded to the exterior of the tank. The three ribs are located at equally spaced points around the half of the tank following the canvas supporting plates 40 in the unidirectional rotation of the tank. With this arrangement and during rotation of the tank from its stable position, the canvas will tend to drop back onto the ribs and cover their sharp points so as to avoid injury to the animal.

It will be apparent that, as an animal engages the underside of the preferred tank 10 of FIGS. 1 to 6 and exerts a horizontal force to the right as viewed in FIG. 6, the tank will be rotated in the counterclockwise direction as shown by the exterior arrow and as permitted by the ratchet teeth 29 riding beneath the pawl 30. As an animal moves into engagement with the tank and exerts a horizontal force to the left as viewed in FIG. 6, rotation of the tank will be prevented by the pawl, but the tank probably will be raised so as to slacken the chains or swing the tank and its supporting arm 12 as a unit upwardly with respect to the chains and in a counterclockwise arc as indicated by the arrow on the end plate 20 and the dot-dash lines in FIG. 6. When the animal releases the tank and permits it to descend under these conditions, there is a tendency for the tank to rotate as permitted by the pawl.

To increase the tendency of the tank 10 to rotate when the ratchet end is raised by an animal moving in a direction opposite to that which produces rotation of the tank as permitted by the pawl and ratchet, the supporting arm 12 for the ratchet preferably is divided into two sections which are pivotally connected at 45 with a lower section 12b swingable in a vertical plane relative to the upper section 12a. The pawl 30 and its supporting bar 31 are mounted on the lower section. It is also preferred to make the support at the other end of the tank jointed with a pivotal connection 46 between the two sections as shown in FIG. 5. In each construction, two plates 47 welded on opposite sides of the upper section extend downwardly beyond the upper section and straddle the upper end portion of the lower section, the pivot pins 45 and 46 extending through aligned apertures in these plates and upper end portions of the lower sections of the arms.

At the ratchet end of the tank 10, one of the support arm plates 47 extends laterally beyond the arm sections to provide a downwardly facing stop 48 which engages an upwardly facing surface 48a on the pawl supporting bar 31 to limit rotation of the lower section with respect to the upper section. In order to avoid locking of the two arm sections 12a and 12b, the stop surfaces 48 and 48a are so located that, when they are engaging each other, the upper section 12a is inclined out of alinement with the lower section. Such misalinement is exaggerated in FIG. 6 where the surfaces are shown out of contact with each other. Limitation of rotary movement of the pawl 30 away from the ratchet 26 occurs upon engagement of the pawl with the nearest cotter pin 45.

To increase the amount of liquid delivered to the exterior of the tank 10' and made available for transfer to the animal hides, two Archimedes' pumps 14' may be provided as shown in a modification in FIG. 7, the parts of the modification which correspond to those of the preferred construction bearing similar but primed reference characters. Although these pumps may spiral in the same direction with the tank confined to rotate in only one direction, the tank is shown as rotatable in either direction and the pumps spiral in opposite directions from pick-up troughs 33' on diametrically opposite sides of the tank adjacent one end thereof and terminate in diametrically opposite apertures in the plate at the other end of the tank. With this arrangement, each pump delivers fluid during rotation of the tank in a different direction. It will be apparent that this same action may be achieved by spiraling the two screws in opposite directions and locating the outlets of the screws at opposite ends of the tank. The tubes also communicate individually with the bodies 34' of different outlet valves 18' which are connected individually to outlet pipes 15' on diametrically opposite sides of the exterior of the tank.

The outlet holes on each of the outlet pipes 16' of the modification of FIGS. 7 and 8 are arranged along a spiral as in a preferred form so that the holes on each pipe are effective during the 180° of tank rotation that the pipe is disposed below a horizontal plane through the tank axis. With two outlet pipes, two canvas sheets 13' are provided, one for each pipe. To utilize liquid delivered to one outlet of the pipe but flowing through the same without discharging through any of the outlet holes in the pipe, it is preferred to connect the ends of the outlet pipes at both ends of the tank by cross tubes 50. These tubes extend into the valve bodies and communicate with the outlet pipes through the outer end portions of the center bores 35' in the valve bodies so as not to interfere with the action of each valve in controlling the outlet flow of the associated Archimedes' pump separately. Air is admitted to the interior of the tank to relieve any vacuum through a suitable check valve 51 in the filler plug 22'.

To render both Archimedes' pumps 14' and outlet pipes 15' substantially equally effective, the modified tank 10' of FIGS. 7 and 8 is mounted to rotate about its own longitudinal axis rather than about an offset axis as in the preferred construction. The supporting bolts 23' thus are aligned axially with the tank. Instead of being rotatable only in one direction, the modified tank 10' is rotatable in opposite directions, one Archimedes' pump being effective during rotation in one direction and the other pump delivering fluid to the outlet pipe during rotation in the opposite direction. The one-way coupling 17 thus is omitted from the modified construction. In the event that more liquid is delivered by one pump than by the other due to rotation of the tank more in one direction than the other, the excess liquid from the associated outlet pipe will flow through the cross pipes 50 to the other outlet pipe. In this way, saturation of both drapes 13' is insured. The supporting arms 12' of the modified construction are formed of single pieces rather than being jointed as in the preferred construction.

In service use of the apparatus, it has been found that the greatest wear on each canvas sheet 13' occurs adjacent the ends of the tank and the sheet mounting plates 40. To avoid such wear, these parts of the sheets are protected by guards 52 projecting downwardly below the tank ends. While these guards may be secured to the tank, herein, they are downward extensions of the supporting arms 12' as shown in FIG. 7.

It will be apparent that the novel liquid applying apparatus described above is of simple and inexpensive construction with few moving parts likely to become damaged or inoperable during service use of the apparatus. Further, the parts which transfer liquid from the interior to the exterior of the tank and into the drapes 13 are protected from contact by the animals and from dirt on the animals likely to clog the liquid pathways. By virtue of the novel manner of offsetting the axis of rotation of the tank from the central axis, the opposite ends of the tank are alternately raised and lowered not only to insure flow of liquid throughout the length of the outlet pipe but also to mix the liquid within the tank. By locating the control valves at the outlet ends of the Archimedes' pumps, the flow from each pump can be controlled easily and accurately to compensate for changes in the viscosity of the liquid as may occur during temperature changes.

I claim:

1. In a liquid applying apparatus for animals, the combination of an elongated hollow liquid-containing tank having a longitudinal central axis, two supports disposed adjacent but beyond opposite ends of said tank and connected to elongated flexible elements by which they are suspended from an overhead support, bearings on said supports mounting said tank for rotation about a horizontal axis extending longitudinally of said central tank axis but offset angularly from the tank axis in opposite directions at opposite ends of the tank, a one-way connection between said tank and one of said supports permitting rotation of the tank in only one direction about said horizontal axis of rotation, an outlet pipe extending longitudinally of said tank on the exterior thereof and having outlet openings at spaced points along its length for gravitation of liquid from the pipe, an Archimedes' screw pump mounted on said tank and spiralling about said axis of rotation in a direction to carry fluid from an inlet end of the pump within the tank and adjacent one end thereof to an outlet end of the pump adjacent the other end of the tank when the tank is rotating in said one direction, a connection between said outlet pipe and said outlet end of said pump, and a flexible sheet of material extending along the length of said tank with one edge adjacent said outlet holes of said outlet pipe and with the remainder of the sheet depending from the pipe so that liquid gravitating from the outlet holes is intercepted by and gravitates along the sheet where it is available to be transferred to the hides of animals coming in contact with the sheet, opposite ends of said tank being raised and lowered alternately during rotation of the tank due to said offsetting of the axis of rotation with respect to said central axis of the tank.

2. In a liquid applying apparatus for animals, the combination of an elongated hollow liquid-containing tank, two supports connected to two flexible elongated elements by which they are suspended from an overhead framework, said tank being mounted at opposite ends in said supports for rotation about a horizontal axis extending longitudinally of the tank, an outlet pipe extending longitudinally of said tank on the exterior thereof and having outlet openings at spaced points along its length for gravitation of liquid from the pipe, an Archimedes' screw pump mounted on said tank and spiralling about said axis of rotation to carry fluid from an inlet end of the pump within the tank and adjacent one end of the tank to an outlet end of the pump adjacent the other end of the tank when the tank is rotating in a direction correlated with the direction of spiralling, a connection between said outlet end and said outlet pipe for the flow of liquid from the pump and into the pipe, an air inlet pipe communicating with the exterior of said tank adjacent said one tank end and spiralling along the tank from such end and toward said other tank end in the same direction as the spiral of said screw pump, a one way coupling between said tank and one of said supports permitting rotation of the tank only in said direction in which said pump delivers liquid to said outlet pipe, and a flexible sheet of material extending along the length of said outlet pipe and depending therefrom so that liquid gravitating from the outlet holes is intercepted by the sheet where it is retained for transfer to the hides of animals contacting the sheet.

3. In a liquid applying apparatus for animals, the combination of an elongated liquid-containing tank, elongated flexible elements adapted to be suspended from an overhead framework, two rigid support members carried by the lower ends of said elements and supporting opposite ends of said tank for rotation of the tank about a horizontally disposed axis extending longitudinally of the tank, liquid delivery means for outlet holes at spaced points along the exterior of said tank, said delivery means including an Archimedes' screw spiraling about said axis and operable during rotation of the tank to deliver liquid to said outlet holes from an inlet end of the screw located within the tank, a one-way coupling comprising two members, one mounted on said tank and the other on one of said members and selectively engaging each other to permit rotation of the tank with respect to the member only in one direction in which said screw delivers liquid to said outlet holes, and liquid absorbing material secured to the exterior of said tank to receive liquid gravitating from said outlet holes.

4. The combination of claim 3 in which said inlet end of said screw within said tank is connected to a pickup trough opening circumferentially of the tank for scooping liquid from a lower level of the tank during rotation of the tank and carrying the liquid upwardly for delivery to said inlet end of the screw during continued rotation of the tank.

5. The combination of claim 3 in which said outlet holes are formed in a straight pipe extending longitudinally of said tank on the exterior thereof and are located on a spiral about the pipe so as to open downwardly at different times during rotation of the tank through each revolution.

6. The combination of claim 3 in which said supports are elongated arms disposed in a vertical position adjacent opposite ends of said tank with bearings mounted in the lower ends of the arms, said arms extending upwardly beyond the tank to avoid wrapping of said flexible elements about the adjacent ends of the tank in the event the ends are raised by animals engaging the underside of the tank.

7. The combination of claim 3 in which said one support member is an elongated vertically disposed arm divided into upper and lower sections pivotally connected together with the lower section carrying a bearing for rotatably supporting the adjacent end of said tank, and said one-way connection comprises a ratchet secured to and rotatable with said tank and a pawl pivotally connected to said upper section of said arm.

8. The combination of claim 3 in which an air inlet pipe communicates with the exterior of said tank and spirals along the tank in the same direction as the spiral of said screw for the entrance of air into the tank during rotation of the tank in said one direction and the accompanying delivery of liquid to said outlet holes.

9. The combination of claim 3 in which there are two elongated flexible elements at each end of said tank and said elements are connected at their lower ends to the adjacent one of said support members and diverge upwardly therefrom to horizontally spaced points on said overhead framework.

10. In a liquid applying apparatus for animals, the combination of an elongated hollow liquid-containing tank, two elongated flexible elements, two supports connected to said elements and suspended thereby from an overhead framework, said tank being mounted at opposite ends in said supports for rotation about a horizontal axis extending longitudinally of the tank, an outlet pipe extending longitudinally of said tank on the exterior thereof and having outlet openings at spaced points along its length for gravitation of liquid from the pipe, and a pump mounted on said tank and operating to deliver fluid from an inlet of the pump within the tank to said outlet openings during rotation of the tank about said axis, said axis of rotation of said tank being offset angularly from the longitudinal axis of said tank and in opposite directions at opposite ends of the tank so that the tank ends are raised and lowered alternately to insure distribution of liquid throughout the length of said outlet pipe.

11. In a liquid applying apparatus for animals, the combination of an elongated hollow liquid-containing tank, elongated flexible elements adapted to be suspended from an overhead support, two support members carried by lower ends of said elements and supporting opposite ends of said tank for rotation of the tank about a horizontally disposed axis extending longitudinally of the tank, liquid delivery means for outlet holes at spaced points along the exterior of said tank, said delivery means containing an Archimedes' screw spiraling about said axis and operable during rotation of the tank in one direction to deliver liquid to said outlet holes from an inlet end of the screw located within the tank, an air inlet screw communicating at one end with the exterior of said tank and spiraling along the tank from such end in the same direction as the spiral of said Archimedes' screw to deliver air to the interior of the tank when the tank is rotating in said one direction and the Archimedes' screw is delivering liquid to said outlet holes, and liquid absorbing material secured to the exterior of said tank to receive liquid gravitating from said outlet holes.

References Cited by the Examiner
UNITED STATES PATENTS

| | | | |
|---|---|---|---|
| 2,133,898 | 10/38 | Mansfield | 119—157 |
| 2,711,722 | 6/55 | Gray | 119—157 |
| 2,988,052 | 6/61 | Hesse | 119—157 |
| 3,020,883 | 2/62 | Elwick | 119—157 |
| 3,038,445 | 6/62 | Fleming | 119—157 |
| 3,103,916 | 9/63 | Keene | 119—157 |

SAMUEL KOREN, *Primary Examiner.*

ALDRICH F. MEDBERY, *Examiner.*